(12) United States Patent
Barry et al.

(10) Patent No.: US 9,095,918 B2
(45) Date of Patent: Aug. 4, 2015

(54) CUTTER STRUCTURES, INSERTS COMPRISING SAME AND METHOD FOR MAKING SAME

(75) Inventors: John James Barry, County Clare (IE); Timothy Peter Mollart, Oxfordshire (GB); Roger William Nigel Nilen, Oxfordshire (GB)

(73) Assignees: Element Six Abrasives S.A, Luxembourg (LU); Element Six Limited, County Clare (IE)

( * ) Notice: Subject to any disclaimer, the term of this patent is extended or adjusted under 35 U.S.C. 154(b) by 0 days.

(21) Appl. No.: 14/232,487

(22) PCT Filed: Jul. 17, 2012

(86) PCT No.: PCT/EP2012/064003
§ 371 (c)(1),
(2), (4) Date: Jan. 13, 2014

(87) PCT Pub. No.: WO2013/011025
PCT Pub. Date: Jan. 24, 2013

(65) Prior Publication Data
US 2014/0239051 A1    Aug. 28, 2014

Related U.S. Application Data

(60) Provisional application No. 61/509,073, filed on Jul. 18, 2011.

(30) Foreign Application Priority Data

Jul. 18, 2011 (GB) .................................. 1112325.4

(51) Int. Cl.
*B23K 1/00* (2006.01)
*B23B 27/14* (2006.01)
(Continued)

(52) U.S. Cl.
CPC ............. *B23K 1/0008* (2013.01); *B23B 27/143* (2013.01); *B23B 27/148* (2013.01);
(Continued)

(58) Field of Classification Search
USPC ....................................................... 228/121
See application file for complete search history.

(56) References Cited

U.S. PATENT DOCUMENTS 5,453,105 A    9/1995   Middlemiss et al.
5,766,394 A    6/1998   Anderson et al.
(Continued)

FOREIGN PATENT DOCUMENTS

CN    101280666 A    10/2008
EP    0560287 A1    9/1993
(Continued)

OTHER PUBLICATIONS

International Search Report for PCT/EP2012/064003 dated Mar. 12, 2013.
(Continued)

*Primary Examiner* — George Wyszomierski
*Assistant Examiner* — Ngoclan T Mai
(74) *Attorney, Agent, or Firm* — Bryan Cave LLP

(57) ABSTRACT

A method of making a cutter structure comprising super-hard material defining a rake face topology is provided. The method includes providing a pre-sinter assembly comprising a substrate body having a formation surface defining a topology complementary to the rake face topology, and an aggregation comprising a plurality of super-hard grains, the aggregation disposed adjacent the formation surface of the substrate body, the substrate body comprising a source of catalyst or binder material capable of promoting the sintering of the super-hard grains at a pressure and temperature at which the super-hard material is thermodynamically stable; subjecting the pre-sinter assembly to the pressure and temperature to provide a sintered polycrystalline super-hard structure joined to the formation surface of the substrate body at a first major boundary of the super-hard structure and having a second major boundary surface opposite the formation surface; removing the substrate body to expose the first major boundary of the super-hard structure defining the rake face topology. Cutter inserts and machine tools are also provided.

16 Claims, 1 Drawing Sheet

Figure 1A:
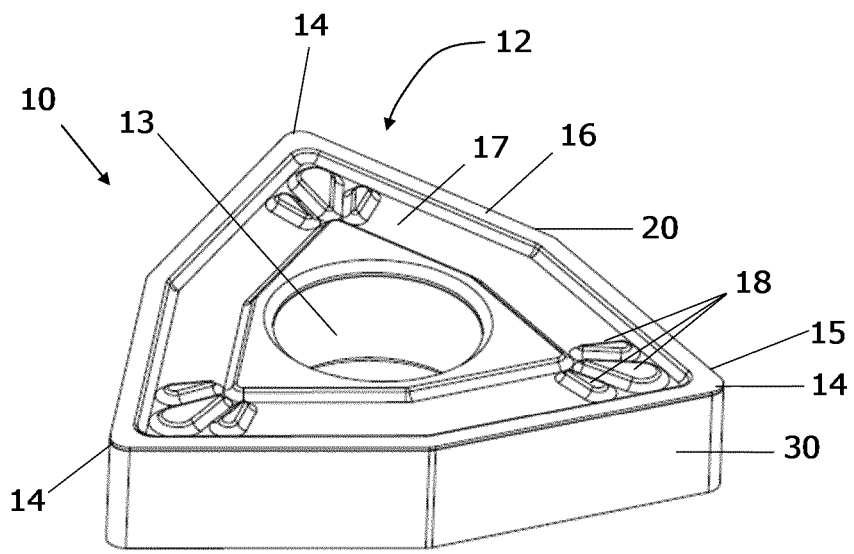

(51) Int. Cl.
  *C04B 35/645* (2006.01)
  *C04B 37/02* (2006.01)
(52) U.S. Cl.
  CPC ............ C04B35/645 (2013.01); C04B 37/026 (2013.01); *B23B 2226/125* (2013.01); *B23B 2226/315* (2013.01); *B23B 2240/08* (2013.01); *B23K 2001/12* (2013.01); *C04B 2235/427* (2013.01); *C04B 2235/5436* (2013.01); *C04B 2237/122* (2013.01); *C04B 2237/128* (2013.01); *C04B 2237/361* (2013.01); *C04B 2237/363* (2013.01); *C04B 2237/401* (2013.01)

(56) References Cited

U.S. PATENT DOCUMENTS

| | | | |
|---|---|---|---|
| 6,106,585 A | 8/2000 | Packer et al. | |
| 6,179,886 B1 | 1/2001 | Gordeev et al. | |
| 6,446,740 B2 | 9/2002 | Eyre | |
| 6,447,560 B2* | 9/2002 | Jensen et al. | 51/293 |
| 6,447,852 B1 | 9/2002 | Gordeev et al. | |
| 6,709,747 B1 | 3/2004 | Gordeev et al. | |
| 6,919,040 B2 | 7/2005 | Fries et al. | |
| 7,008,672 B2 | 3/2006 | Gordeev et al. | |
| 2010/0175519 A1 | 7/2010 | Deschenaux et al. | |
| 2010/0181117 A1 | 7/2010 | Scott | |
| 2011/0171414 A1* | 7/2011 | Sreshta et al. | 428/64.1 |
| 2011/0176879 A1* | 7/2011 | Jonker et al. | 408/144 |

FOREIGN PATENT DOCUMENTS

| | | |
|---|---|---|
| GB | 2366804 A | 3/2002 |
| JP | 2006 187813 A | 7/2006 |
| WO | 2007/049140 A2 | 5/2007 |
| WO | 2009/013713 A2 | 1/2009 |
| WO | 2010/129813 A2 | 11/2010 |

OTHER PUBLICATIONS

International Search Report for GB1112325.4 dated Nov. 17, 2011.
International Search Report for GB1212672.8 dated Oct. 9, 2012.

* cited by examiner

CUTTER STRUCTURES, INSERTS COMPRISING SAME AND METHOD FOR MAKING SAME

The disclosure relates generally to cutter structures comprising super-hard material, inserts for machine tools comprising same and methods for making same.

U.S. Pat. No. 6,106,585 discloses a method for making a cutting element, including forming a composite mass by placing a mass of abrasive crystals, either diamond or CBN, and a mass of catalyst metal in contact with the abrasive crystals into a cell or can which is a protective shield metal enclosure, in which the top surface of the inside of the can is pre-formed with dimples. This dimpled surface provides a pattern for forming features on the top surface of the layer, which function as chip breaker features.

United Kingdom patent number GB 2 366 804 discloses using a nucleation side of chemical vapour deposited (CVD) diamond for tool surfaces, the nucleation side containing diamond microcrystals that have been formed on a deposition substrate. This patent explains that CVD diamond tools made using the disclosed method have advantages over polycrystalline diamond (PCD) tools, which all contain more than 10 per cent cobalt. It is understood that PCD material may comprise the cobalt as a result of the ultra-high pressure, high temperature method used to manufacture it, in which the cobalt (or other iron group metal) is believed to promote the inter-growth of a plurality of diamond grains under pressure and temperature conditions at which diamond is more thermodynamically stable than graphite. Since cobalt can also promote the reconversion of diamond to amorphous carbon or graphite at ambient pressure, the PCD must be kept below a temperature of about 700 degrees Celsius. Unlike PCD, the CVD diamond is made entirely of diamond and consequently has a longer wear life.

There is a need to provide super-hard inserts for machine tools having effective performance, good tool life and to provide a more efficient method for making same.

Viewed from a first aspect there is provided a method of making a cutter structure comprising super-hard material defining a rake face topology, the method including providing a pre-sinter assembly comprising a substrate body having a formation surface defining a topology that is complementary to the rake face topology, and an aggregation comprising a plurality of super-hard grains, the aggregation disposed adjacent the formation surface, in which the substrate body comprises a source of catalyst or binder material capable of promoting the sintering of the super-hard grains at a pressure and temperature at which the super-hard material is thermodynamically stable; subjecting the pre-sinter assembly to the pressure and temperature to provide a super-hard structure comprising sintered polycrystalline super-hard material joined to the formation surface at a first major boundary of the super-hard structure, the super-hard structure having a second major boundary opposite the first major boundary; removing the substrate body to expose the first major boundary of the super-hard structure defining the rake face topology The formation surface is configured to include at least an area that is complementary to the rake face topology. So, for example, for at least one depression and or protrusion feature that may be present in the rake face topology, there will be a corresponding respective protrusion or depression present on the formation surface. In other words, the topology of the formation surface may be analogous to a negative of the rake face topology.

Various arrangements and combinations of features for cutter structures and inserts, and variations of the method are envisaged by the disclosure, of which non-limiting and non-exhaustive examples are described below.

In various examples, the cutter structure may be for an insert for a machine tool, and or the super-hard material may define a major rake face including a chip-breaker topology, and or the cutter structure may be joined to an insert base.

In various examples, the rake face topology may be capable of functioning as a chip breaker topology in use, comprising at least one chip breaker feature, and in various example arrangements, the chip-breaker feature or features may be at least about 100 microns and up to about several millimeters in size; the cutter structure may have a mean thickness (between the first and second major boundaries) of at least about 100 microns or at least about 500 microns; and or the cutter structure may have a mean thickness of at most about 2,000 microns, at most about 1,000 microns or at most about 500 microns; and the cutter structure may comprise natural or synthetic diamond material, or CBN material.

Examples of polycrystalline super-hard material include polycrystalline diamond (PCD) material, thermally stable PCD material, silicon carbide bonded diamond (SCD) or polycrystalline cubic boron nitride (PCBN). The cutter structure may comprise diamond material manufactured by means of a chemical vapour deposition (CVD) method, but will not consist essentially of diamond material made by means of a CVD method. In some arrangements, the cutter structure may be free of diamond material made by means of a CVD method.

In some examples, polycrystalline super-hard material within a first region that is adjacent to or defines at least an area of the first major boundary may have lower hardness and or abrasion resistance than that within a second region substantially remote from the first major boundary, such as adjacent the second major boundary. The first region may be substantially conformal with at least an area of the first major boundary. The first region may extend to a depth from the first major boundary, in which the depth may be at least about 50 microns or at least about 100 microns. The second region may be adjacent the first region and extend to a depth of about 100 microns, 200 microns or 500 microns from the boundary with the first region. The polycrystalline super-hard material within a first region may have a lower mean content of the super-hard grains (be they substantially dispersed or substantially inter-grown with each other) in volume and or weight per cent terms than does the polycrystalline super-hard material in the second region. The content of catalyst or binder material in the first region may be substantially greater than in the second region or it may be less than in the second region, at least some of the catalyst of binder material in the first region possibly having been removed after sintering the polycrystalline super-hard material. In some examples, the polycrystalline super-hard material in the first region may comprise at least about at least about 10 or at least about 20 per cent more catalyst or binder material (in weight and or volume terms) than material in the second region. So, for example, if the polycrystalline super-hard material within the second region comprises about 10 weight per cent catalyst or binder material, polycrystalline super-hard material in the first region may comprise at least about 11 weight per cent or at least about 12 weight per cent catalyst or binder material and correspondingly less material in the form of super-hard grains.

In some examples, the method may include treating the super-hard structure to remove catalyst or binder material from interstices between inter-bonded diamond grains comprised in the cutter structure. In a particular example, the super-hard structure may comprise PCD material and the method may include treating the super-hard structure to remove catalyst material such as Co from interstices between the inter-bonded diamond grains, which is likely to have the effect of improving the thermal stability and resilience of the PCD material. This is likely to reduce or prevent degradation of the PCD material should it be joined to the insert base by a method involving heating the super-hard structure, such as brazing.

In some examples, the substrate body may comprise cemented carbide material and the cementing material may comprise the source of the catalyst or binder material for sintering the super-hard material. The cementing material may comprise cobalt (Co), for example.

In some examples, the aggregation may contain a source of catalyst or binder material for sintering the super-hard material, such as cobalt, or pre-cursor material for the catalyst or binder material.

The method may include joining the cutter structure at the second major boundary to an interface surface of an insert base. In some examples, the method may include joining the second major boundary of the super-hard structure to an insert base and then removing the substrate body to expose the first major boundary of the super-hard structure. In some examples, the super-hard structure may be formed integrally between the substrate on one side and a base body on an opposite side (i.e. the super-hard layer may be sandwiched between these bodies and bonded to them), and the substrate may be removed, for example by grinding it away to expose the chip-breaker feature or features on the first major boundary.

In some examples, the substrate body and the insert base may both comprise cemented carbide material. The substrate body may comprise a first cemented carbide material and the insert base may comprise a second cemented carbide material, the first and second cemented carbide materials differing substantially in at least one aspect of composition and or physical or chemical property. For example, the second cemented carbide material may comprise a higher content of carbide material and a lower content of cementing material than does the first cemented carbide material. The second cemented carbide material may be substantially harder and or have a substantially greater elastic modulus than the first cemented carbide material. This may have the aspect that the cemented carbide material of the substrate body is suitable for providing a source of catalyst material for sintering the polycrystalline super-hard material and the cemented carbide material of the insert base may be more suitable for a tool.

Various methods may be used to form the formation surface topology onto the formation surface of the substrate body, such as electro-discharge machining (EDM), laser machining, by means of a machine tool or by etching, depending to some extent on the type of material comprised in the substrate body. Alternatively, the substrate body may be formed with the features of the formation surface topology. For example, the method may include forming the features of the formation surface onto a surface of a green body comprising pre-cursor material for the substrate body and sintering the green body to form the substrate body.

In various examples, the pressure may be at least about 4 GPa, at least 5 GPa or at least 7 GPa, and in various examples the temperature may be at least 1,200 degrees Celsius or at least 1,400 degrees Celsius. In some examples, the ultra-high pressure may be at least about 5.5 GPa, at least about 6 GPa, at least about 7 GPa or at least about 8 GPa, and the catalyst material may comprise cobalt (Co), iron (Fe), nickel (Ni) and or manganese (Mn), or the catalyst material may be substantially non-metallic, such as a salt.

In some examples, the method may include processing the polycrystalline super-hard material to form a cutting edge onto the super-hard structure, adjacent to which the rake face comprising the rake face topology will be located. Methods of processing the super-hard material may include grinding, electro-discharge machining (EDG) and or laser cutting, for example.

The substrate body may be removed by grinding and or acid treatment or corrosion, for example, to provide a self-supporting super-hard structure.

The cutter structure may have a mean thickness of at least about 100 microns or at least about 500 microns, and or a mean thickness of at most about 2,000 microns, at most about 1,000 microns or at most about 500 microns.

Disclosed example methods may have the aspect of being relatively less complex and or more efficient than certain other methods.

Viewed from a second aspect there is provided a cutter structure comprising polycrystalline super-hard material defining a rake face including a rake face topology, in which polycrystalline super-hard material within a first region that is adjacent to the rake face has lower hardness or abrasion resistance than that within a second region substantially remote from the rake face, such as adjacent the second major boundary.

Various arrangements and combinations of features are envisaged by this disclosure for example cutter structures, including but not limited to examples described above in relation to the first aspect, explicitly and or implicitly for example cutter structures, as well as examples described below.

The first region may be substantially conformal with at least an area of the first major boundary. The first region may extend to a depth from the first major boundary, in which the depth may be at least about 50 microns or at least about 100 microns. The second region may be adjacent the first region and extend to a depth of about 100 microns, 200 microns or 500 microns from a boundary with the first region. The polycrystalline super-hard material within the first region may have a lower mean content of the super-hard grains (be they substantially dispersed or substantially inter-grown with each other) in volume and or weight per cent terms than does the polycrystalline super-hard material in the second region. The content of catalyst or binder material in the first region may be substantially greater than in the second region or it may be less than in the second region, at least some of the catalyst of binder material in the first region possibly having been removed after sintering the polycrystalline super-hard material. In some examples, the polycrystalline super-hard material in the first region may comprise at least about at least about 10 or at least about 20 per cent more catalyst or binder material (in weight and or volume terms) than material in the second region. So, for example, if the polycrystalline super-hard material within the second region comprises about 10 weight per cent catalyst or binder material, polycrystalline super-hard material in the first region may comprise at least about 11 weight per cent or at least about 12 weight per cent catalyst or binder material and correspondingly less material in the form of super-hard grains.

While wishing not to be bound by a particular theory, example arrangements of cutter structures made using the disclosed method and having relatively softer region of polycrystalline super-hard material adjacent or defining a rake face or cutting edge may have the aspect of enhanced tool life. This may arise since, although super-hard material has excellent abrasive wear resistance it is relatively more brittle than certain other industrial cutting material such a s cemented carbide material. A somewhat softer region adjacent a working surface may be expected to have the aspect of reducing the risk of chipping, fracture or cracking of the cutter structure. The formation of a softer region adjacent the first major boundary of the cutter structure may arise from infiltration of molten catalyst material from the substrate body into the aggregation during the sintering step and the consequent formation of an intermediate layer between the super-hard structure and the substrate body, in which the intermediate layer has a relatively high content of the catalyst material.

Cutter structures made according to this disclosure may be provided with the desired rake face topology directly from the sintering step and are likely to have the aspect that polycrystalline material adjacent to or defining the rake face may be softer than substantially the rest of the polycrystalline super-hard material. Unlike in other methods, a substantial area of the rake face including the desired topology as formed in the sintering step is unlikely to require subsequent further processing by grinding and so forth, since it will likely already have the desired dimensional specification. Indeed, it may be quite difficult to carry out such post-sintering processing on the rake face without risking damage to the desired topology. Cutter inserts made according to this disclosure are likely to have the aspects of sufficiently good rake face topology dimensional accuracy and a somewhat softer layer of the polycrystalline super-hard material adjacent to or defining the rake face topology, thus potentially having a protective effect on the cutter structure in use.

Viewed from a third aspect there is provided an insert for a machine tool, comprising a cutter structure according to this disclosure.

In some examples, the insert may comprise a cutter structure joined to an insert base, for example by means of a layer of joining material such as braze alloy, the cutter structure comprising super-hard material and having a major rake face including a depression and or a protrusion capable of functioning as a chip-breaker feature in use; i.e. the major rake face includes a chip-breaker topology.

Figure 1B:
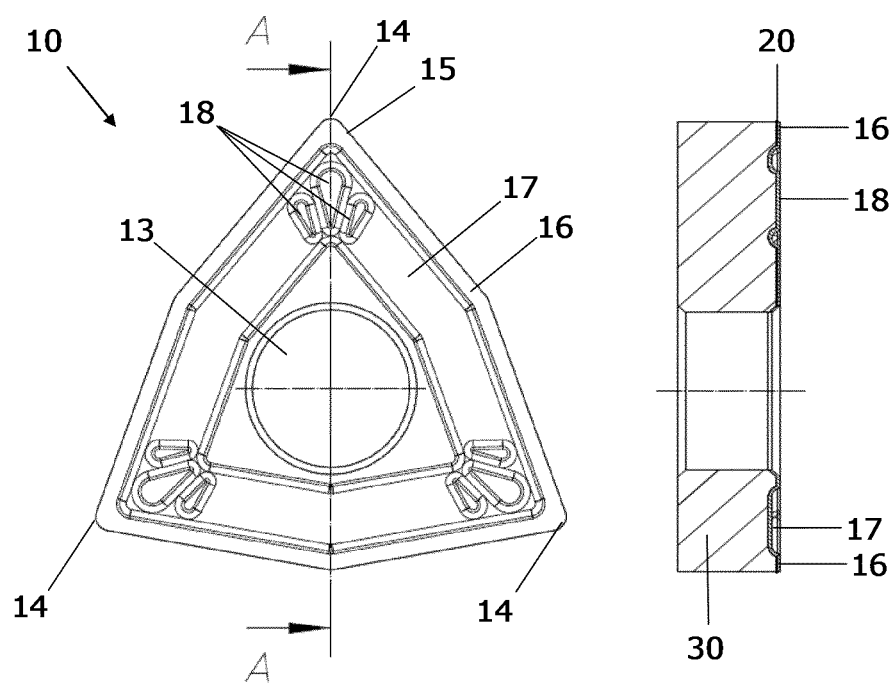

Non-limiting example arrangements are described below with reference to the accompanying drawings, of which FIG. 1A shows a perspective view of an example indexable insert for a machine tool; and FIG. 1B shows a plan view and a section view of indexable insert shown in FIG. 1A, the section corresponding to the plane A-A.

With reference to FIG. 1A and FIG. 1B, an example indexable insert 10 for a machine tool (not shown) comprises a PCD cutter layer 20 brazed to an insert base 30, the cutter layer 20 defining a rake face 12 having a chip-breaker topology. The insert 10 has three corners 14 and a central pin hole 13 for securing the insert 10 to the machine tool, a cutting edge 15 formed at each corner 14. The chip-beaker topology includes a ridge 16 arranged around the outer edge of the rake face 12, a trough 17 arranged adjacent the ridge 16 and a plurality of generally radially arranged protrusions 18 in the tough 17 proximate each of the corners 14.

Example methods of making example PCBN and PCD structures will now be described.

In some examples, the aggregation of super-hard grains may comprise substantially loose super-hard grains or super-hard grains combined with a binder material for binding the grains together. The aggregation may comprise diamond or CBN grains and may be provided in the form of a plurality of sheets, granules, flakes or powder, comprising diamond or CBN grains having a mean size of at least about 0.1 micron and at most about 30 microns, held together by organic binder. At least some of the sheets, granules, flakes or powder comprised in the aggregation may also comprise tungsten carbide grains and or catalyst or binder material for sintering diamond or CBN, or pre-cursor material for the catalyst or binder material. The method may include shredding or otherwise fragmenting sheets to provide a plurality of plate-like granules or flakes, which may be compacted together against the formation surface of the substrate body. In some examples, the aggregation may comprise an extruded body comprising the super-hard grains. In some examples the method may include providing slurry or paste comprising the super-hard grains and making the aggregation by injection moulding or casting the slurry or paste.

An aggregation in the form of sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740. Alternative methods for depositing diamond-bearing layers include spraying methods, such as thermal spraying. In some examples, the aggregation may comprise a mixture of diamond grains and catalyst material for diamond such as Co, Ni, Fe, Mn, which may be combined together by means of milling (e.g. ball billing), and cast into sheets using a plasticizer binder material such as PMMA, DBP and so forth. In some examples the super-hard grains are CBN grains and the super-hard structure may comprise PCBN material. In such examples, the aggregation may comprise a mixture of boron nitride powder with a binder material containing Ti, Al, W or Co and the mixture cast into sheets using a plasticizer material.

In an example method for making a PCD cutter structure, an aggregation comprising a plurality of diamond grains held together by means of an organic binder material may be provided. The mean size of the diamond grains may be at least about 1 micron and or at most about 20 microns. The aggregation may be contacted with the formation surface of the substrate body and this combination may be encapsulated within an overlapping dual cup arrangement to form a pre-sinter assembly. The pre-sinter assembly may be assembled into a capsule for an ultra-high pressure furnace (which may also be referred to as an ultra-high pressure press), heated in a furnace to remove volatile gasses and or to burn off organic binder material, and subjected to a pressure of at least about 5.5 GPa and a temperature of at least about 1,300 degrees Celsius, thus sintering together the diamond grains to form a sintered construction comprising a PCD structure joined to a substrate body. At least some of the cobalt for promoting the sintering of the diamond may be sourced from the cemented carbide substrate, since cobalt cementing material present in the substrate will be molten under these conditions and some of it will infiltrate into the aggregation of diamond grains and promote their inter-growth. After the sintering process at the ultra-high pressure, the sintered construction comprising the PCD material joined to the formation surface of the substrate body can be recovered from the ultra-high pressure apparatus and capsule material removed from it.

In some examples, the super-hard structure may comprise PCBN material as described in international application number WO2007049140 and may be manufactured by a method including providing a powdered composition suitable for the manufacture of PCBN, the powder comprising at least 80 volume per cent CBN particles and a powdered binder material, and subjecting the powder composition to attrition milling. The composition may comprise CBN particles of more than one average particle size. In one example, the average size of the CBN particles may be at most about 12 microns or at most 2 microns. The binder material may includes one or more of phase(s) containing aluminium, silicon, cobalt, molybdenum, tantalum, niobium, nickel, titanium, chromium, tungsten, yttrium, carbon and iron. The binder material may include powder with uniform solid solution of more than one of aluminium, silicon, cobalt, nickel, titanium, chromium, tungsten, yttrium, molybdenum, niobium, tantalum, carbon and iron. The milled powder combination may then be formed into a pre-sinter body by compacting the powder at an elevated temperature and pressure, and the pre-sinter body may be subjected to an ultra-high pressure of at least about 5 GPa and a temperature of at least about 1,200 degrees Celsius to sinter the powder combination and produce a PCBN body. Non-limiting examples are described in more detail below to illustrate the method.

EXAMPLE 1

A chip-breaker surface topology configuration may be designed according to the requirements of a given machining application and having regard to the intended shape of a machine tool insert. A cobalt-cemented carbide substrate body may be provided, having a surface comprising a surface topology that is complementary (i.e. inverse) to that of the chip-breaker topology. The features may be formed onto the surface by machining a green body for the substrate, i.e. prior to the substrate being sintered to form a cemented carbide body. A pre-compact assembly may be prepared by forming a plurality of diamond grains into an aggregation against the surface of the substrate, and encapsulating the assembly within a metal jacket. The diamond grains may have a mean size of at least about 1 micron and at most about 20 microns and the aggregation may be sufficiently thick (i.e. comprise a sufficiently large number of diamond grains) for a PCD layer having a thickness of at least about 1 millimeter to be produced. The pre-compact assembly may be subjected to an ultra-high pressure of at least about 5.5 GPa and a temperature of at least about 1,250 degrees Celsius to melt the cobalt comprised in the substrate body and sinter the diamond grains to each other to form a composite compact comprising a PCD structure formed joined to the substrate. The substrate may be substantially removed by grinding it away and the PCD structure may be treated in acid to remove residual cemented carbide material bonded to it and or to leach out cobalt within interstitial regions between the inter-grown diamond grains. Removal of a substantial amount of cobalt from the PCD structure is likely to increase substantially the thermal stability of the PCD structure and will likely reduce the risk of degradation of the PCD material when brazing it to an insert base. The PCD cutter structure may be brazed onto an interface surface of a cemented carbide insert base (i.e. another cemented carbide body) by means of an active braze alloy such as TiCuSil braze alloy in a vacuum, the second major surface being disposed adjacent the interface surface and the first major surface being exposed opposite the interface. The composite compact thus formed may be processed such as by grinding to provide a machine tool insert comprising a PCD cutter structure having well-defined chip-breaker features.

EXAMPLE 2

A chip-breaker surface topology configuration may be designed according to the requirements of a given machining application and having regard to the intended shape of a machine tool insert. A cobalt-cemented carbide substrate body may be provided, having a surface comprising a surface topology that is complementary (i.e. inverse) to that of the chip-breaker topology. The features may be formed onto the surface by machining a green body for the substrate, i.e. prior to the substrate being sintered to form a cemented carbide body. A pre-compact assembly may be prepared by forming a plurality of cubic boron nitride (CBN) grains into an aggregation against the surface of the substrate, and encapsulating the assembly within a metal jacket. The aggregation may also include a blend of powders comprising 86 weight per cent CBN grains and a binder material comprising 70.0 weight per cent Al, 11.7 weight per cent Co and 18.3 weight per cent W. The CBN grains may have a mean size in the range from about 12 microns to about 17 microns and the aggregation may be sufficiently thick for a PCBN layer having a thickness of at least about 1 millimeter to be produced. The pre-compact assembly may be subjected to an ultra-high pressure of at least about 5 GPa and a temperature of at least about 1,300 degrees Celsius to sinter the aggregation to form a composite compact comprising a PCBN structure formed joined to the substrate. The substrate may be substantially removed by grinding it away and the PCBN structure may be treated in acid to remove residual cemented carbide material bonded to it. The PCBN cutter structure may be brazed onto an interface surface of a cemented carbide insert base (i.e. another cemented carbide body) by means of an active braze alloy such as TiCuSil braze alloy in a vacuum, the second major surface being disposed adjacent the interface surface and the first major surface being exposed opposite the interface. The composite compact thus formed may be processed such as by grinding to provide a machine tool insert comprising a PCBN cutter structure having well-defined chip-breaker features.

Certain terms and concepts as used herein will be briefly explained.

A machine tool is a powered mechanical device, which may be used to manufacture components comprising materials such as metal, composite materials, wood or polymers by machining, which is the selective removal of material from a body, called a work-piece. A machine tool may comprise a cutter insert (or simply "insert") comprising a cutter structure, and the insert may be indexable and or replaceable.

When a machine tool is in use machining a work-piece, pieces of the work-piece will likely be removed and these pieces are referred to as "chips". Chips are the pieces of a body removed from the work surface of the body by a machine tool in use. Controlling chip formation and directing chip flow are important aspects of tools for high productivity machining and or high surface finish machining of advanced alloys of aluminium, titanium and Nickel. The geometry of chip-breaker features may be selected according to various machining factors, such as the work piece material, cutting speed, cutting operation and surface finish required.

A rake face of a cutter insert is the surface or surfaces over which the chips flow when the tool is used to remove material from a body, the rake face directing the flow of newly formed chips. A rake face topology may be a desired configuration of the rake face, for example a configuration for more effectively breaking and or removing chips.

As used herein, a chip breaker surface topology means a configuration of a surface of an insert for a tool (for example for a machine tool or other tool) suitable for controlling aspects of the size and shape of chips formed when the tool is used to cut, bore into or machine a work-piece or other body. Such topology may include depression and or protrusion features, such as radial or peripheral ridges and troughs, formed on a rake surface of the insert.

As used herein, super-hard or ultra-hard material has Vickers hardness of at least about 25 GPa. Synthetic and natural diamond, polycrystalline diamond (PCD), cubic boron nitride (CBN) and polycrystalline CBN (PCBN) material are examples of super-hard materials. Synthetic diamond, which may also be called man-made diamond, is diamond material that has been manufactured. A PCD structure comprises or consists essentially of PCD material and a PCBN structure comprises or consists essentially of PCBN material. Other examples of super-hard materials include certain composite materials comprising diamond or CBN grains held together by a matrix comprising ceramic material, such as silicon carbide (SiC), or by cemented carbide material such as Co-bonded WC material (for example, as described in U.S. Pat. No. 5,453,105 or 6,919,040). For example, certain SiC-bonded diamond materials may comprise at least about 30 volume per cent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

In general and as used herein, catalyst material for super-hard material is capable of promoting the sintering of polycrystalline material comprising grains of the super-hard material, at least at a pressure and temperature at which the super-hard material is thermodynamically stable. The catalyst material may be capable of promoting the direct inter-growth of grains of the super-hard material and or more generally the sintering of the grains of the super-hard material to form the polycrystalline material. In some examples, the catalyst material may function as a binder material capable of forming a sintered matrix, on its own or in combination with other suitable material, within which the super-hard grains may be dispersed and not necessarily directly inter-bonded with each other. For example, catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co and Mn, and certain alloys including these. Catalyst or binder material for PCBN material may comprising a Ti-containing compound, such as titanium carbide, titanium nitride, titanium carbonitride and or an Al-containing compound, such as aluminium nitride, and or compounds containing metal such as Co and or W, for example.

As used herein, polycrystalline diamond (PCD) material comprises a mass (an aggregation of a plurality) of diamond grains, a substantial portion of which are directly inter-bonded with each other and in which the content of diamond is at least about 80 volume per cent of the material. Interstices between the diamond grains may be at least partly filled with a binder material comprising a catalyst material for synthetic diamond, or they may be substantially empty. Bodies comprising PCD material may comprise at least a region from which catalyst material has been removed from the interstices, leaving interstitial voids between the diamond grains. PCBN material comprises grains of cubic boron nitride (CBN) dispersed within a matrix comprising metal or ceramic material. For example, PCBN material may comprise at least about 35 volume per cent or at least about 50 volume per cent CBN grains dispersed in a matrix material comprising a Ti-containing compound, such as titanium carbide, titanium nitride, titanium carbonitride and or an Al-containing compound, such as aluminium nitride, and or compounds containing metal such as Co and or W. Some versions (or "grades") of PCBN material may comprise at least about 80 volume per cent or even at least about 90 volume per cent CBN grains.

Thermally stable PCD material comprises at least a part or volume of which exhibits no substantial structural degradation or deterioration of hardness or abrasion resistance after exposure to a temperature above about 400 degrees Celsius, or even above about 700 degrees Celsius. For example, PCD material containing less than about 2 weight per cent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

As explained above, PCD material and PCBN material may be provided by sintering a plurality of diamond or CBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

As used herein, cemented carbide material (which may also be referred to as hardmetal material) comprises a plurality of grains of carbide material such as tungsten carbide, titanium carbide or tantalum carbide held together by a cementing (also referred to as binder) material such as cobalt. The content of the carbide grains may be at least about 50 per cent.

As used herein, a green body is a body comprising material capable of being sintered but which has not yet been finally or fully sintered. The green body may have the general configuration of the intended sintered body and is intended to be sintered.

The invention claimed is:
1. A method of making a cutter structure for an insert for a machine tool, comprising super-hard material defining a rake face topology comprising a depression or protrusion, the method including:
   providing a pre-sinter assembly comprising a substrate body having a formation surface defining a topology that is complementary to the rake face topology, comprising a protrusion or depression corresponding to the respective depression or protrusion of the rake face topology, and an aggregation comprising a plurality of super-hard grains, the aggregation disposed adjacent the formation surface, in which the substrate body comprises a source of catalyst or binder material capable of promoting the sintering of the super-hard grains at a pressure and temperature at which the super-hard material is thermodynamically stable;
   subjecting the pre-sinter assembly to the pressure and temperature to provide a super-hard structure comprising sintered polycrystalline super-hard material joined to the formation surface at a first major boundary of the super-hard structure, the super-hard structure having a second major boundary opposite the first major boundary;

removing the substrate body to expose the first major boundary of the super-hard structure defining the rake face topology; and joining the second major boundary of the super-hard structure to an insert base.

2. A method as claimed in claim 1, in which the rake face topology comprises a chip breaker surface topology.

3. A method as claimed in claim 1, in which the super-hard material comprises polycrystalline diamond (PCD) material or polycrystalline cubic boron nitride (PCBN) material.

4. A method as claimed in claim 2, in which the super-hard material comprises polycrystalline diamond (PCD) material or polycrystalline cubic boron nitride (PCBN) material.

5. A method as claimed in claim 2, in which polycrystalline super-hard material within a first region that is adjacent to the first major boundary has lower hardness than that within a second region substantially remote from the first major boundary.

6. A method as claimed in claim 5, in which the first region extends to a depth of at least 50 microns from the first major boundary.

7. A method as claimed in claim 5, in which the second region extends to a depth of 200 microns from a boundary with the first region.

8. A method as claimed in claim 5, in which the content of catalyst or binder material in the first region is substantially less than in the second region.

9. A method as claimed in claim 5, in which polycrystalline super-hard material in the first region comprises at least 10 per cent more catalyst or binder material than does polycrystalline super-hard material substantially in the second region.

10. A method as claimed in claim 1, including removing at least some of the catalyst or binder material from the polycrystalline super-hard material adjacent the first major boundary.

11. A method as claimed in claim 1, including joining the second major boundary of the super-hard structure to an insert base and then removing the substrate body to expose the first major boundary of the super-hard structure.

12. A method as claimed in claim 1, in which the substrate body comprises a first cemented carbide material and the insert base comprises a second cemented carbide material, the first and second cemented carbide materials differing substantially in at least one aspect of composition.

13. A method as claimed in claim 12, in which the second cemented carbide material comprises a higher content of carbide grain material and a lower content of cementing material than does the first cemented carbide material.

14. A method as claimed in claim 1, including forming the formation surface topology onto a surface of a green body comprising pre-cursor material for the substrate body and sintering the green body to form the substrate body.

15. A method as claimed in claim 1, including removing the substrate body by means of acid treatment or treatment with corrosive material.

16. A method as claimed in claim 1, in which polycrystalline super-hard material within a first region that is adjacent to the first major boundary has lower hardness than that within a second region substantially remote from the first major boundary.

* * * * *